United States Patent [19]

Haese

[11] 3,950,492

[45] Apr. 13, 1976

[54] PROCESS FOR REMOVAL OF AMMONIA, HYDROGEN SULFIDE AND HYDROGEN CYANIDE FROM GASES CONTAINING THESE SUBSTANCES

[75] Inventor: Egon Haese, Bochum, Germany

[73] Assignee: Dr. C. Otto & Comp. G.m.b.H., Germany

[22] Filed: Feb. 11, 1974

[21] Appl. No.: 441,249

[52] U.S. Cl. ................ 423/220; 423/236; 423/238
[51] Int. Cl.² ..................... C01B 17/16; C01C 3/00
[58] Field of Search ........... 423/220, 222, 236, 238

[56] References Cited
UNITED STATES PATENTS

| | | | |
|---|---|---|---|
| 1,609,872 | 12/1926 | Garner et al. | 423/236 |
| 3,021,189 | 2/1962 | Mancke et al. | 423/220 |
| 3,833,714 | 9/1974 | Renault et al. | 423/222 |

OTHER PUBLICATIONS

Jacobson, *Encyclopedia of Chemical Reactions*, Reinhold Publishing Corp., 1951, Vol. IV, p. 69.

*Primary Examiner*—Earl C. Thomas
*Assistant Examiner*—Wayne A. Langel
*Attorney, Agent, or Firm*—Brown, Murray, Flick & Peckham

[57] ABSTRACT

Coke oven gases are washed with an aqueous metallic salt solution of sulfuric acid or sulfurous acid to absorb ammonia, hydrogen sulfide and hydrogen cyanide. The washing solution is then oxidized to recover elementary sulfur. A portion of the oxidized washing fluid is returned for continued washing of gas and a portion of the washing fluid is diverted to a separater where solid compounds which include metal hydroxide and metal cyanide compounds are removed leaving ammonium sulfate solution. The ammonium sulfate solution is heated with combustion air and in a heating agent to produce combustion products including nitrogen, hydrogen and an acid anhydride. The solid compounds from separater are conducted as a aqueous suspension to a reaction vessel wherein, at elevated temperature and pressure, hydrolysis products are formed including free ammonia, metal hydroxide and formate salts. The metal hydroxide is reacted with the acid anhydride in a condensation tower to form reaction products including an aqueous solution of the metal salt which is then conducted together with the formate salt products for further washing of the gas. The ammonia product from the hydrolysis process is returned for washing by the aqueous metallic salt solution and subsequent removal by combustion process.

5 Claims, 1 Drawing Figure

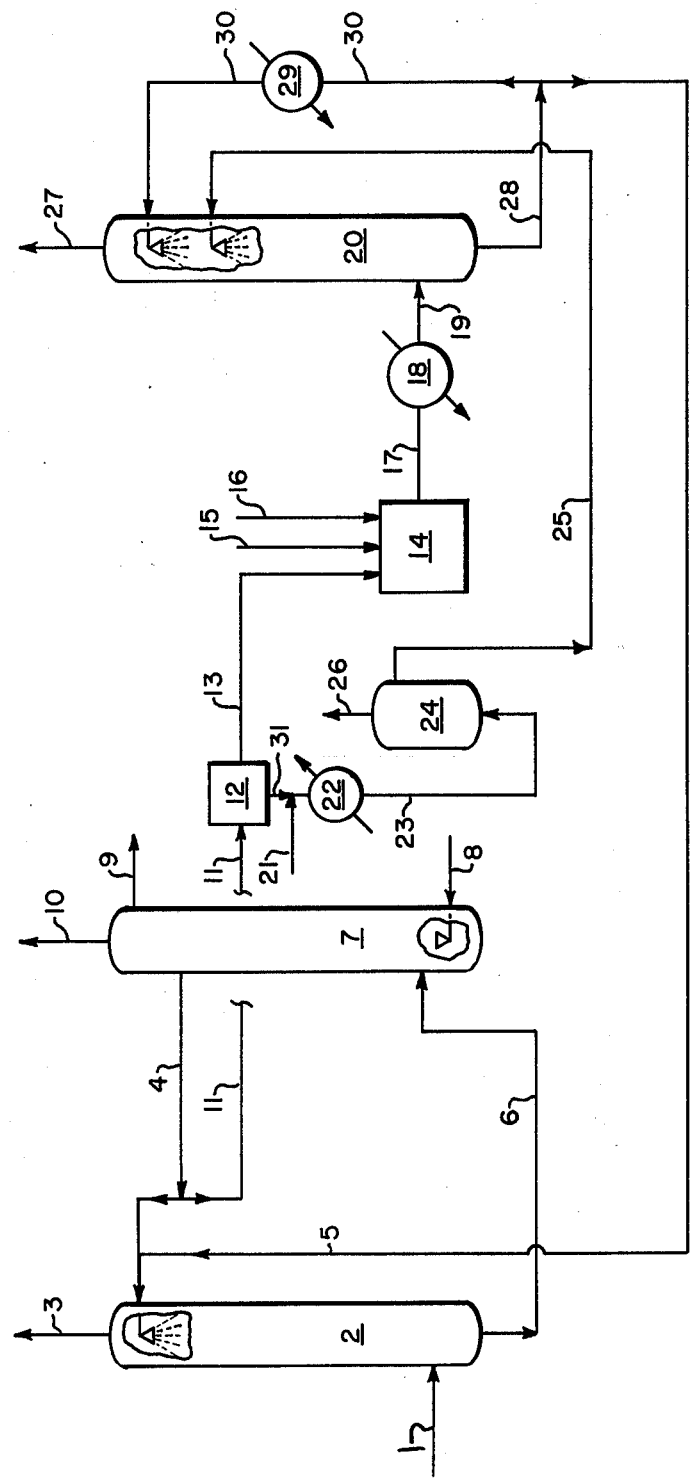

3,950,492

PROCESS FOR REMOVAL OF AMMONIA, HYDROGEN SULFIDE AND HYDROGEN CYANIDE FROM GASES CONTAINING THESE SUBSTANCES

BACKGROUND OF THE INVENTION

This invention relates to the process for the removal of ammonia, hydrogen sulfide, and hydrogen cyanide from gases, especially coke oven gas, which is washed with an aqueous solution of metallic salts of sulfuric acid or sulfurous acid. More particularly, the present invention relates to the subsequent treatment of the washing solution in a closed system including the use of an oxidizer to remove sulfur in the forms of flowers of sulfur from the washing solution.

There are known processes utilizing an aqueous solution of caustic alkali, particularly iron sulfate, as an absorption agent to remove ammonia, hydrogen sulfide and hydrogen cyanide from gases. In these processes, the ammonia is changed into ammonium sulfate $(NH_4)_2SO_4$. Most of the hydrogen sulfide is transformed into iron sulfide, FeS, and the hydrogen cyanide is transformed into iron cyanide compounds. Most of these processes provide for the subsequent treatment of the washing solution by processing it through an oxidizer wherein oxygen or gases containing oxygen are injected into an oxidizing vessel. In the oxidation process, elementary sulfur is liberated from the iron sulfide and removed in the form of flowers of sulfur and the resulting iron hydroxide is once again returned in the cycle for further washing of gases.

All of these known processes have the acute disadvantage that they require the constant addition of iron sulfate for the formation of ammonium sulfate and iron cyanide compounds and then these processes require the removal of the ammonium sulfate and the iron compounds from the cycle. This means, of course, that the employment of these processes is greatly limited by the fact that even if caustic alkali is readily and economically available, the production of crystalline ammonium sulfate is no longer economical from the standpoint of a saleable product since the need for products containing ammonia has been replaced by more favorable and economical processes. Furthermore, new environmental regulations require the total elimination of poisonous cyanide compounds.

One prior proposal for the removal of ammonia, hydrogen sulfide and hydrogen cyanide from coke oven gas by washing with metal salts, provides in the process that the gas is washed with an aqueous solution of metal salts of sulfurous acid and, if necessary, with the further addition of salts of sulfuric acid so that the gas bearing washing solution is carried in a cycle through an oxidizer. A part of the washing fluid leaving the oxidizer is diverted and, after the addition of a heating agent, subjected to a combustion process. The combustion products produced contain nitrogen, water vapor, a formed acid anhydride and metal or metallic oxide. The combustion products are then cooled. The acid anhydride and the metal or metallic oxide are reactively combined for the production of fresh salt solution which is then employed to maintain the aqueous metallic salt solution in the washing cycle. It is a necessary part of this process which is not part of the present level of technique, to employ special installations for the combustion process in order to produce fine divided or granulation of metal oxides from the combustion process. The most favorable grain size of these metal oxides was determined to be at a range between 5 and 20 microns. It is critically necessary that these metal oxides have such a fine granular size in order to achieve a reaction within a maintained period of time. This reaction takes place between the metallic oxide and the acid anhydride which is not economically favorable but acceptable in the process. This process has other significant limitations in that the specific capacity and maximum size of the combustion vessels are limited due to the dust-load factor, i.e., the dust density of the resultant combustion gases. In instances requiring a very large through-put capacity to the combustion process, then this could only be accomplished by providing and operating several installations for the combustion process in parallel with one another.

SUMMARY OF THE INVENTION

It is an object of the present invention to increase the through-put capacity of a combustion process in connection with the removal of ammonia, hydrogen sulfide and hydrogen cyanide from gases in such a manner that even with large-scale capacity requirements for the combustion process, only one combustion apparatus is required for entire gas purification process.

In accordance with the present invention there is provided a process to remove gaseous ammonia hydrogen sulfide and hydrogen cyanide from a gas, especially coke oven gas, the process includes the steps of washing the gas with an aqueous metallic salt solution including an acid with sulfur and hydrogen constituate elements to remove the gaseous ammonia, hydrogen sulfide and hydrogen cyanide, oxidizing the metallic salt solution bearing the gases, returning a first portion of the metallic salt solution after oxidation thereof for further washing of gas, separating out of a second portion of the metallic solution after oxidation thereof solid components which include metal hydroxide and metal cyanide compound leaving ammonium sulfate solution, heating the ammonium sulfate solution to produce combustion products including nitrogen, hydrogen and acid anhydride, cooling the combustion products, forming an aqueous suspension of said solid compounds, hydrolyzing the aqueous suspension at an elevated temperature and pressure to form products including ammonia, metal hydroxide and formate salts, reacting at least the metal hydroxide products of the hydrolysis process with the acid anhydride of the combustion process to form reaction products including an aqueous solution of a metallic salt, and using this aqueous solution of a metallic salt together with the first portion of the metallic salt solution after oxidation thereof to extract further quantities of the gaseous ammonia, hydrogen sulfide and hydrogen cyanide.

More specifically, the process of the present invention provides for the removal of ammonia, hydrogen sulfide and hydrogen cyanide from gases, especially coke oven gas, by washing these substances with an aqueous solution of metallic salts of sulfuric acid or sulfurous acid and then conducting the washing solution in a cycle through an oxidizer. Part of the oxidized washing solution leaving the oxidizer is returned for further washing of gas and a second part of the oxidized washing solution is diverted for a treating process. According to the present invention this process provides that solid substances are removed during a separation process from the diverted portion of the oxidized washing solution. Ammonium sulfate solution remains after the separation of solid substances which is then subjected to a combustion process after the addition of a heating agent. The products from combustion process contain nitrogen, water vapor and a formed acid anhydride which are then cooled and transported to a condensation tower. The process of the present invention further provides that the skimmed solid materials from the separator which contain metallic hydroxide and metallic cyanide compounds, are mixed with water to form a suspension which is then treated at an elevated temperature and increased pressure in such a manner that the cyanide compounds hydrolyze and as a result free ammonia, metal hydroxides and formate salts are formed. The reaction products from the hydrolysis process are combined with the combustion products in the aforementioned condensation tower. In this tower a reaction takes place between the acid anhydride and the metal oxide to form new metal sulfate or sulfide which is then returned to the washing cycle for the purpose of washing further quantities of gas in this closed process.

The process of the present invention further provides that the hydrolysis of the cyanide compounds occurs at a temperature exceeding 190°C. A further characteristic of the process of the present invention provides that the free ammonia resulting after the hydrolysis process is combined with the gas to undergo the washing process. Ammonium formate results from this hydrolysis process and it is returned to the washing cycle together with the regenerated aqueous metallic salt solution. In this manner the ammonium formate will undergo the combustion process together with the ammonium sulfate as it is carried by the diverted portion of the oxidized washing solution from the oxidizer.

Thus it can be seen that in accordance with the present invention a number of important and significant advantages stem therefrom. First, the specific throughput capacity or, in other words, thermal combustion chamber load, is reduced several times. Another advantage lies in the fact that the reaction time required for the recovery or regeneration of fresh salt solution from the acid anhydride and the metal compound can be decreased to less than 20% from that of known processes.

In the execution of the process of the present invention, the following individual processes take place. The diverted portion of washing fluid from the oxidizer, which is used in the regeneration of the aqueous metallic salt solution, essentially contains ammonium sulfate, tri-valent iron hydroxide and the iron cyanide compounds. These iron cyanide compounds are almost exclusively in the form of ferro cyanide. The iron hydroxide and the ferro cyanide are separated from the solution by the filtering process and then the clarified solution which consists almost entirely of ammonium sulfate is subjected to the combustion process. The waste gas from the combustion process contains no solid substances but rather only combustion products of the ammonia, the heating agent as well as the formed acid anhydride. After cooling of the gases in the heat recovery installation they then are delivered to a condensation tower. The solid substances recovered from the filtering procedure are suspended in a fluid which may be either condensate or the solution from the cycle. The suspension is then treated in a pressure apparatus at 190°C to 280°C. In the pressure apparatus, the iron cyanide compounds are hydrolyzed into formate salts by the addition of water and the simultaneous formation of ammonia and bi-valent iron hydroxide. If iron salts are employed, the following reaction process occurs:

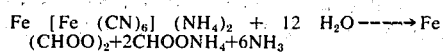

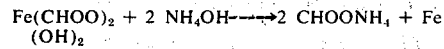

The solution obtained from the hydrolysis process will now contain bi-valent and tri-valent iron hydroxide which are then brought in contact with the waste gas from the combustion process. This occurs in a condensation tower where a chemical reaction takes place. In the tower the acid anhydride reacts with the hydroxide of the metal to form salt sulfates or salt sulfides forming the original washing solution which is then returned to the washing process. The ammonium formate resulting from the saponification is also delivered to the condensation tower and flows back through the washing cycle together with the regenerated solution from where thereafter it is removed and reaches the combustion apparatus where it is totally transformed.

These features and advantages of the present invention as well as the description of the process of the present invention may be more fully understood by referring to the attached drawing which schematically illustrates various apparatus for use in carrying out the steps of the process according to the present invention.

With reference to the drawings, line 1 conducts gas, especially coke oven gas, to undergo processing according to the present invention. The gas is conducted by line 1 to a washing tower 2. The purified gas after washing is exhausted through line 3. Line 4 delivers washing fluid to the washing tower. Regenerated washing solution is conveyed by line 5 into line 4 for entry into the washing tower. In the washing tower the gaseous ammonia, hydrogen sulfide and hydrogen cyanide are transformed into ammonia salts, sulfides and cyanide compounds. Line 6 is used to conduct the washing fluid bearing the absorbed, transformed gases to the lower portion of oxidizing tower 7. Line 8 is used to charge air into the oxidizing tower wherein as a result thereof sulfur is precipitated by oxidizing the sulfur compounds resulting from the hydrogen sulfide gas. Bi-valent iron hydroxide is transformed into tri-valent iron oxide which subsequently plays an important part in the absorption of $H_2S$ gas. The elementary sulfur precipitated in the oxidizing tower is floated by the rising air and leaves the head of the oxidizing tower in the form of flowers of sulfur via line 9 for further treatment. Line 10 is used to discharge waste air from the oxidizer to the outside. The oxidized washing solution is conducted by line 4 and a portion of this solution is returned to the washing cycle. Line 11 is used to draw off a portion of the washing solution and conduct that portion to a filtering apparatus 12. After separating the solid materials from the oxidized washing solution, the clear fluid that remains is discharged to a combustion installation 14 where, with the addition of a heating agent which is added through line 15, and the addition of combustion air which is added through line 16, the clear fluid is burned at 900°C to 1200°C. Known forms of apparatus may be employed to carry out this combustion process.

It has been shown that when pure ammonium sulfate solution is burned, the specific heat output may be increased to two or three fold from prior heat output value due to the absence of metal oxides during the combustion process. Furthermore, there is no longer a need to place limitation with regard to the size of the combustion apparatus. The waste gases from the combustion process, which contain water vapor, nitrogen, carbon dioxide and the acid anhydride are conducted by line 17 through a heat recovery system 18, thence by line 19 to a condensation tower 20.

Line 31 is used to conduct solid substances separated by the filtering device 12. These solid substances are carried by line 31 as a suspension in condensate or solvent which can be added through line 21. A heat exchanger 22 is used to heat the suspension to 190°C to 280°C after which it is transferred by line 23 to a reactor 24. In the reactor, a hydrolysis reaction of the cyanide compounds takes place. The hydrolysis reaction forms ammonium formate and bi-valent iron hydroxide. Tri-valent iron hydroxide is introduced along with the suspension into the reactor 24 but this tri-valent iron hydroxide does not play a roll in the reaction. The hydrolysis reaction also frees ammonia in a gas phase which is drawn off from the reactor 24 by line 26. This gaseous ammonia is introduced into line 1 where it is combined with the coke oven gases to be treated upon entering the washing tower 2. Line 25 is used to conduct the reaction products from the hydrolysis process to the condensation tower. In the tower these reaction products are brought into immediate contact with the waste gas from the combustion process. The chemical reaction in the tower produces a renewed washing solution. This reaction is between the metal hydroxide and the acid anhydride. Liquid drawn off at the bottom of the condensation tower is conducted by line 28 from where a portion is recirculated by line 30 after it passes through a cooler 29 into the condensation tower. Cooler 29 is used to extract residual heat from the fluid in lines 30. A portion of the circulating fluid in the condensation tower 20 is drawn off from line 28 by line 5. The liquid in line 5 is the actual renewed aqueous metallic salt solution which is then added, as previously indicated, to the oxidized washing solution in line 4 for the further washing of gas in the washing tower 2. Line 27 is used to expel waste gases freed from the acid anhydride to the outside.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A process to remove gaseous ammonia, hydrogen sulfide and hydrogen cyanide from a gas, said process including the steps of:

washing a gas containing gaseous ammonia, hydrogen sulfide and hydrogen cyanide with an aqueous iron salt washing solution formed from at least one acid selected from the group consisting of sulfuric acid and sulfurous acid, oxidizing a diverted portion of the washing solution used for said step of washing a gas whereby the oxidized solution essentially includes ammonium sulfate solution containing iron hydroxide and iron cyanide as solid compounds, returning a first portion of the oxidized washing solution for further washing of said gas, separating said iron hydroxide and iron cyanide as solid compounds out of a second portion of the oxidized washing solution to thereby obtain clarified ammonium sulfate solution, heating said clarified ammonium sulfate solution to a temperature of at least 900°C by combustion agents and producing combustion products including nitrogen, water vapor and the acid anhydride of said acid, cooling said combustion products, forming an aqueous suspension of said iron hydroxide and iron cyanide solid compounds, hydrolyzing said aqueous suspension at an elevated temperature of at least 190°C and at an increased pressure to form gaseous ammonia, formate salts and multivalent iron hydroxide, reacting at least said multivalent iron hydroxide from said step of hydrolyzing with said acid anhydride of said combustion products to form an aqueous solution of iron salts as a reaction product, and using said reaction product together with returned portions of the oxidized washing solution for washing further quantities of said gas to absorb gaseous ammonia, hydrogen sulfide and hydrogen cyanide therefrom.

2. The process according to claim 1 wherein said step of hydrolyzing said aqueous suspension occurs at a temperature within the range of 190°C to 280°C.

3. The process according to claim 1 including the further step of adding said gaseous ammonia produced by said step of hydrolyzing to said gas for said step of washing a gas with an aqueous iron salt solution.

4. The process according to claim 1 including the further step of returning said formate salts from said step of hydrolyzing together with said reaction product to wash said gas whereby said formate salts are subsequently processed into combustion products by said step of heating.

5. The process according to claim 1 wherein said clarified ammonium sulfate solution is heated to a temperature within the range of 900°C to 1200°C during said step of heating.

* * * * *